April 7, 1970  S. KURLANDSKY  3,504,864
CHAIN FOR SUPPORTING FLEXIBLE CONDUIT
Filed Aug. 30, 1967  4 Sheets-Sheet 1

INVENTOR
Sam Kurlandsky

BY Hutchen & Kurlandsky

ATTORNEYS

April 7, 1970   S. KURLANDSKY   3,504,864
CHAIN FOR SUPPORTING FLEXIBLE CONDUIT
Filed Aug. 30, 1967   4 Sheets-Sheet 2
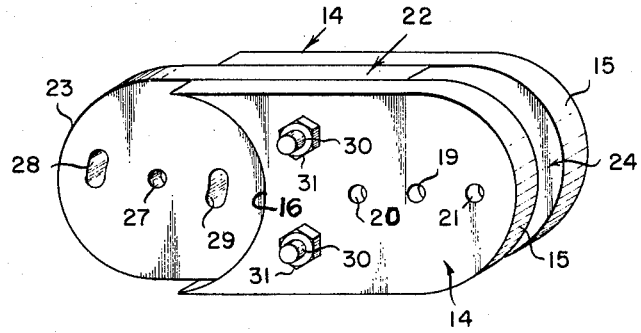
*Fig. 6*
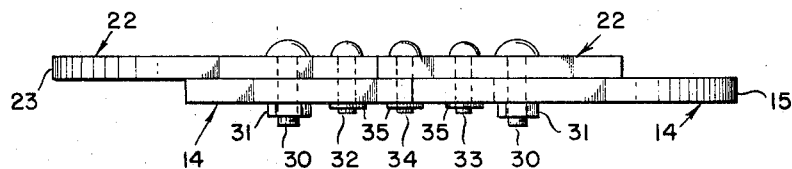
*Fig. 7*
*Fig. 8*
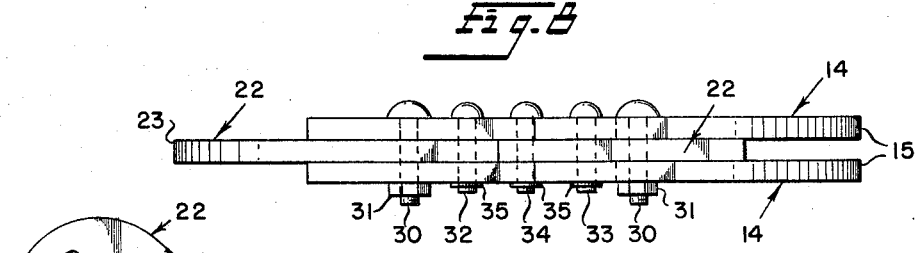
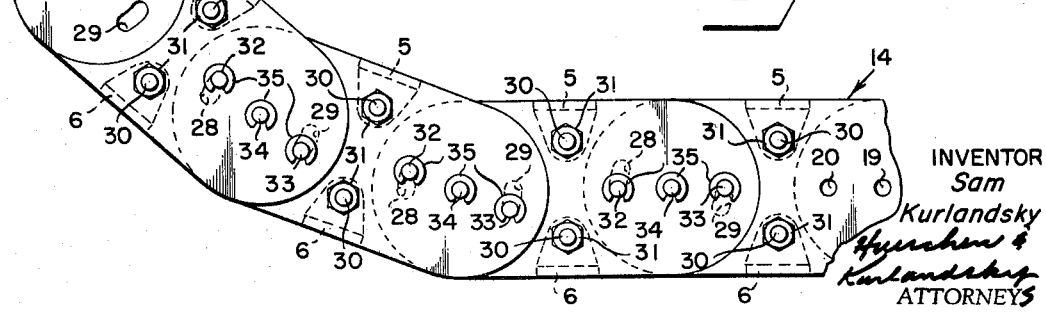
*Fig. 9*
INVENTOR
Sam Kurlandsky
ATTORNEYS

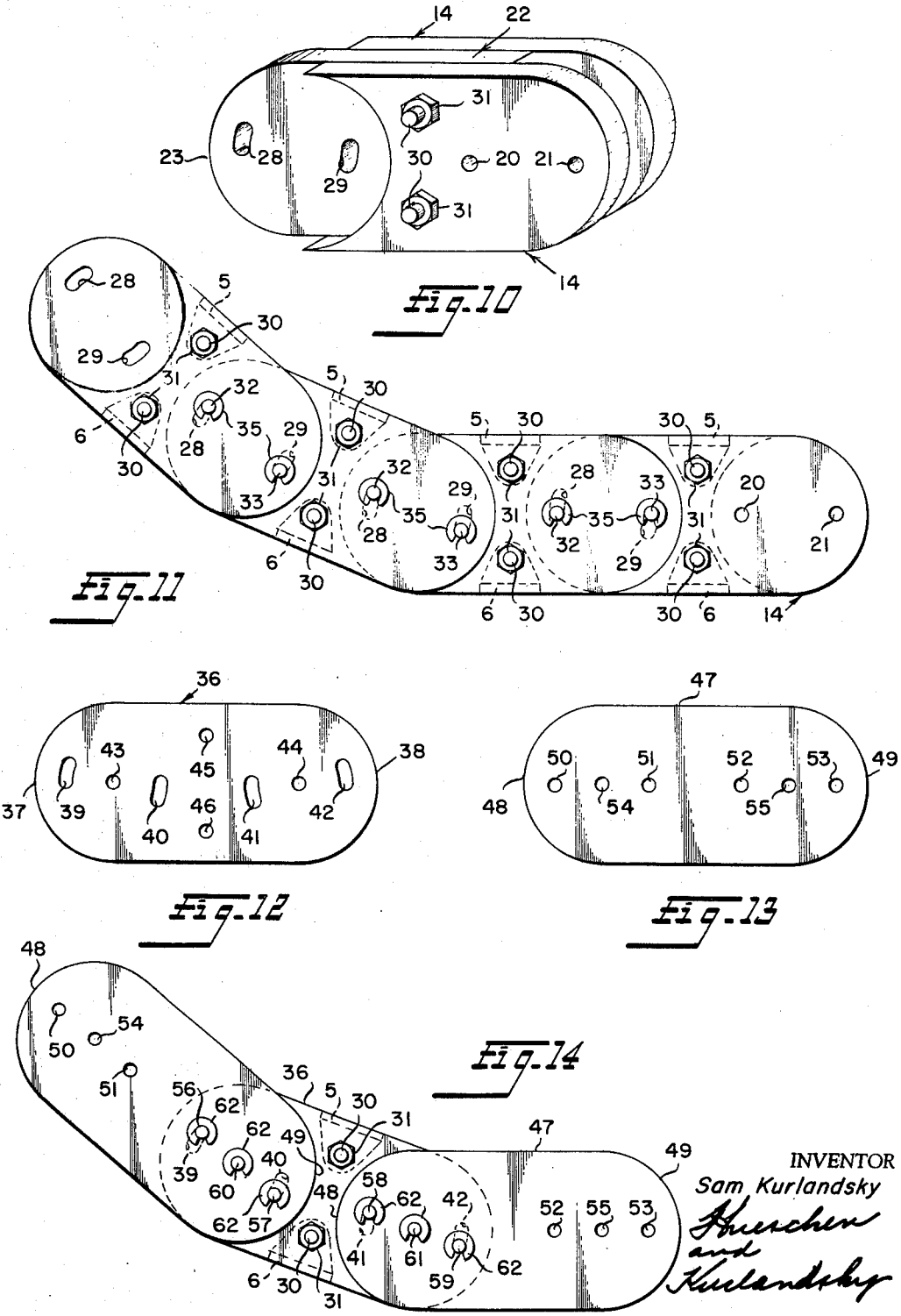

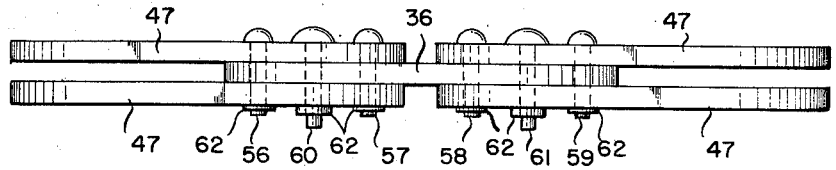
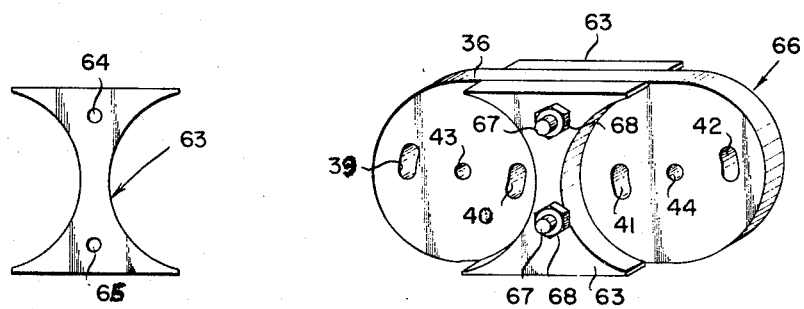
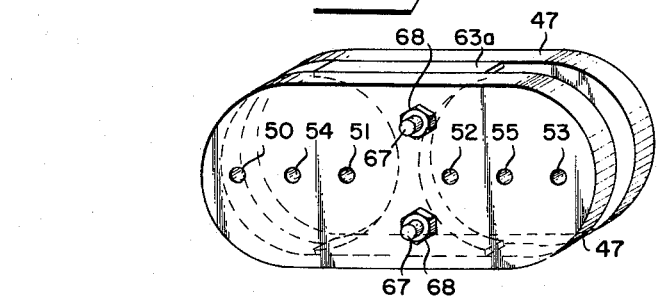
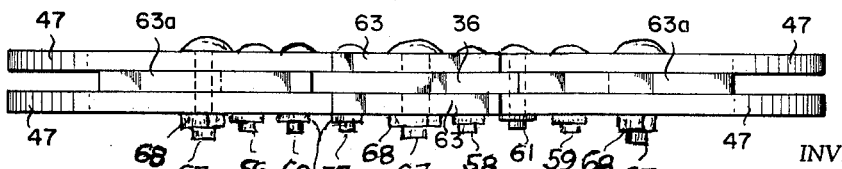

United States Patent Office 3,504,864
Patented Apr. 7, 1970

3,504,864
CHAIN FOR SUPPORTING FLEXIBLE CONDUIT
Sam Kurlandsky, Kalamazoo, Mich., assignor to Aero-Motive Mfg. Co., Kalamazoo, Mich., a corporation of Michigan
Filed Aug. 30, 1967, Ser. No. 664,508
Int. Cl. F16l 3/14, 3/16
U.S. Cl. 248—51                                                                                                     17 Claims

ABSTRACT OF THE DISCLOSURE

A chain for supporting flexible conduit formed of links, pivotally interconnected at their ends, and having two limit pins and two complementary arcuate slots providing limiting positions of pivotal movement between the links of the chain, and providing double support at each limiting position to limit or prevent the imposition of shear force at the pivotal point.

BACKGROUND OF THE INVENTION

The present invention relates to chains and is more particularly concerned with a chain designed to support flexible conduits such as electrical cables and fluid conducting hoses which transport electricity and/or fluids to a movable station.

Apparatus has been disclosed in the prior art adapted to support conduits for electrical current, or liquid or gaseous media to stations which are adapted to move, particularly in a stright line, as for example large machine tools and cranes. Such apparatus utilizes one or more chains comprised of a plurality of interconnected links and having supporting means for the conduit.

Pivotal movement between the links is limited in one direction to a point where the links lie in a straight line and in the other position at an acute angle. Consequently, when in one position the chain is self-supporting in a straight line. Moreover, when turned in the other direction, the chain is self-supporting at a curvature having a predetermined radius. The chain is normally mounted with one end attached to a fixed station and the other attached to a station movable along a straight line path. The chain is normally arranged to extend as a horizontal "U" between the fixed station and the movable station, and in some embodiments is completely self-supporting. In other embodiments a supporting track or bed may be utilized. In most applications two parallel chains held in spaced apart relationship by conduit-supporting members are used.

Prior art chains as described above, although they are generally satisfactory in carrying out their function of supporting cables and conduits, are subject to the disadvantage that in each limiting position a substantial shear force is exerted on the pivot pin at each joint, thereby causing it to wear rapidly and to cause the apparatus to fail. This is particularly true when an operator stands upon the horizontal self-supporting portion of the chain, even though infrequently, during operation or maintenance. An additional disadvantage of some prior art chain supports is that the chains are complicated and expensive to produce.

SUMMARY OF THE INVENTION

It is an object of the invention to provide a chain support for flexible conduit which is self-supporting and is not necessarily supported by means of tracks. It is an additional object to provide a chain support of the type described which is relatively simple and inexpensive to build. It is a further object to provide a supporting chain wherein each pair of links is pivotal between two limiting positions, and wherein the shear force on the pivot is substantially reduced or even completely eliminated. It is a further object to provide a chain support wherein the chain links are fully covered, thereby protecting the operator and preventing foreign particles from entering and causing the chain to fail. The accomplishment of the foregoing and additional objects will become more fully apparent hereinafter.

According to the invention, a chain support for flexible conduit is provided comprised of a plurality of interconnected links, each adjacent pair of links being adapted to pivot at their ends between two limiting positions. In a preferred embodiment, the limits are so designed that the chain is horizontal in one limiting position, and curved about a predetermined radius of curvature at the other limit. Two pins are affixed to one plate and the other plate is provided with complementary arcuate slots. The positions of the pins are so chosen that they are spaced apart from the pivot point and preferably on opposite sides thereof. The arcuate slots are so dimensioned that at each limiting position a point of support is provided on each side of the pivot, thereby reducing or even completely eliminating shear force on the pivot.

BRIEF DESCRIPTION OF THE DRAWINGS

The invention in its preferred embodiments is illustrated by the accompanying drawings in which:

FIG. 6 is a perspective view of a three-plate link.

FIG. 7 is an edge view of a two-plate chain.

FIG. 8 is an edge view of a three-plate link.

FIG. 9 is an edge view of a portion of a chain assembled of links according to FIG. 6.

FIG. 10 is a perspective view of a three-plate link of somewhat modified design.

FIG. 11 is an elevational view of a chain composed of links such as that shown in FIG. 10.

FIG. 12 is a plan view of an inner plate of another embodiment of the invention.

FIG. 13 is a plan view of an outer plate which may be used in conjunction with the inner plate of FIG. 12.

FIG. 14 is an elevational view of a chain composed of links as shown in FIGS. 12 and 13.

FIG. 14a is an edge view of another embodiment.

FIG. 15 is a plan view of inserts which may be used in conjunction with the plates shown in FIGS. 12 and 13 to provide a modified embodiment.

FIG. 16 is a perspective view of a link formed from an inner plate such as shown in FIG. 12 and a pair of inserts such as shown in FIG. 15.

FIG. 17 is a perspective view of an outer link formed of a pair of plates such as shown in FIG. 13 and an insert such as shown in FIG. 15; and FIG. 18 is an edge view taken of a chain comprising a link of FIG. 16 connected to a link of FIG. 17.

Reference is now made to the accompanying drawings for a better understanding of the invention, wherein all the parts are numbered and wherein the same numbers are used to refer to the same parts throughout.

Referring to FIG. 1, a chain support according to the invention is shown together with supported conduits, and comprises lateral chains 1 and 2 each comprised of a plurality of pivotally interconnected links 3 and 4, respectively. The lateral chains 1 and 2 are connected together at intervals by transverse supporting members 5 and 6. A plurality of conduits 7, 8, and 9 are supported between the supporting members 5 and 6. Alternatively, as shown in FIG. 2, single supporting members 11 may be utilized having openings 12 and 13 provided therein through which the conduits extend. The supporting members, whether those of FIG. 1 shown by the numerals 5 and 6 or those of FIG. 2, may be affixed either at each link of the chain or may be spaced one or more links apart.

FIGS. 3 and 4 illustrate basic plates which may be utilized to form links of one form of embodiment of the present invention. FIG. 3 illustrates an outer plate and comprises a sheet-form body 14 having a convex end 15 and a concave end 16. Additionally the plate has mounting holes 17 and 18, a pivot pin hole 19, and limit pin holes 20 and 21. The inner plate shown in FIG. 4 comprises a sheet-form body 22 having a convex end 23 and a concave end 24. The plate of FIG. 4 is preferably identical in size and shape to that of FIG. 3. The inner plate of FIG. 4 additionally has mounting holes 25 and 26, a pivot pin hole 27 and arcuate slots 28 and 29.

FIG. 5 illustrates a two-plate link prepared by affixing the plate of FIG. 3 with the plate of FIG. 4 by means of bolts 30 and nuts 31. Alternatively, rivets or other suitable means may be utilized. The bolts are inserted through the holes 17 and 18, and 25 and 26, respectively. In the preferred embodiment, the plates are so arranged that the convex end 23 of the plate 22 and the concave end 16 of the plate 14 form a circle of which the pivot pin hole 27 is the center. Moreover, the convex end 15 of the plate 14 and the concave end 24 of the plate 22 form a circle of which the pivot pin hole 19 is the center. With the arrangements as described, all the inner links form a row of plates pointed in one direction in which the convex ends of one plate are nested in the concave ends of the other, thereby shielding the moving edges. In similar manner, the inner links form a row of plates pointed in the other direction where the same type of nesting is obtained. As a result, all the moving edges are shielded to prevent personal injuries or entrapment of foreign particles which might damage the links.

FIG. 6 illustrates a chain link formed of two outer plates 14, shown in FIG. 3, bolted together with one inner plate 22, shown in FIG. 4, with the inner plate oriented in opposite direction to that of the outer plates. As shown, the concave ends 16 of the outer plates 14 and convex end 23 of the inner plate 22 are contiguous with the surface of a cylinder whose axis passes through the center of the pivot hole 27. Similarly, the convex ends 15 of the outer plates 14 and the concave end 24 of the inner plate 22 are contiguous with the surface of a cylinder whose axis passes through the center of the pivot holes 19. As a result of this arrangement, when a chain is assembled of the links shown in FIG. 6 the convex ends of each plate in a row nest in concave end cavities of adjacent plates and thus form a completely enclosed chain.

FIG. 7 illustrates in edge view a chain prepared from two links as shown in FIG. 5. In addition to the two links, the chain comprises limit pins 32 and 33 and a pivot pin 34 which are held in place by washers 35. A chain formed as in FIG. 7 is completely shielded at its edges and on one side, but has arcuate slots 28 and 29 which are at least partially exposed.

FIGS. 8 and 9 illustrate a chain formed of three-plate links shown as shown in FIG. 6, and assembled by means of limit pins 32 and 33 and pivot pins 34. The bolts and nuts 30 and 31, as shown in FIG. 9, may be utilized to affix cable supporting members 5 and 6, as shown in FIG. 9. The operation of the chain is best illustrated in FIG. 9. Considering the pivotal joint 70 between two links in the limiting pivotal position in which the links are in a straight line, the pin 32 engages the lower limiting end of the slot 28. The pin 35 engages the upper limiting end of the slot 29. As a result, a limiting force is applied at two points, one on each side of the pivot pin 34. The limiting pins 32 and 35 thus completely support all pivotal forces, thereby substantially completely removing any shear force on the pivot pin 34. When two links are pivoted with respect to each other to limiting positions wherein the links are at an angle less than 180° with respect to each other, as shown at pivotal joint 71, the limit pin 32 now engages the upper limiting end of the arcuate slot 28 while the limit pin 33 now engages the lower limiting end of the arcuate slot 29. Here in similar manner limiting force is applied at two points, one at each side of the pivot pin 34. As a result there is substantially no shear force applied to the limit pin 34, thereby preventing undue wear of the pivot pin. So effective is the arrangement that for many applications the pivot pin can be completely removed without disturbing the pivotal action at each joint. It is of course understood that the chain shown in FIG. 7 and formed of two plate links, as shown in FIG. 5, operates in similar manner. The only difference, as pointed out, is that the arcuate slots 28 and 29 are exposed on one side in the chain of FIG. 7, whereas in the chain of FIGS. 6, 8, and 9 the slots 28 and 29 are completely covered on both sides of the chain.

Figure 1:
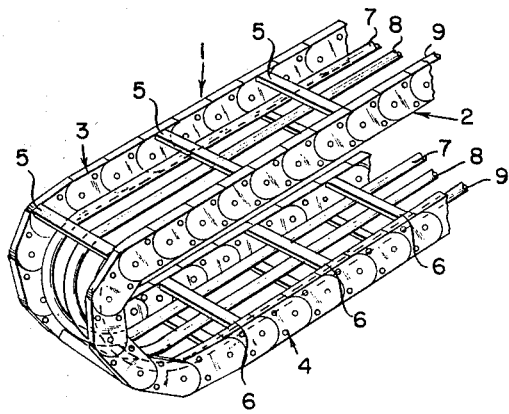
FIG. 1 is a perspective view of a chain assembly and supported conduits.
Figure 2:
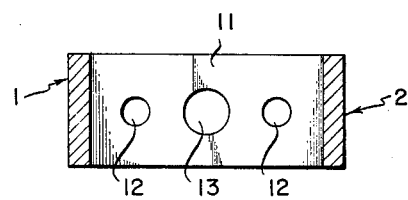
FIG. 2 is a cross-sectional view through a chain assembly having a somewhat modified transverse supporting member.
Figure 3:
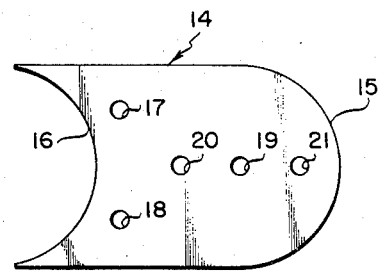
FIG. 3 is a plan view of an outer plate for forming a chain according to the invention.
Figure 4:
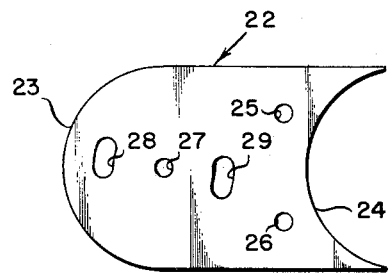
FIG. 4 is a plan view of an inner plate used in conjunction with the outer plate of FIG. 3 to form a link.
Figure 5:
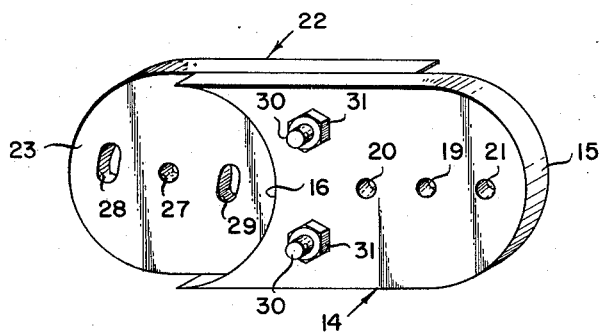
FIG. 5 is a perspective view of a two-plate link.

Although in the preferred embodiment pivot pins 34 are utilized, for some applications, as stated above, they may be dispensed with, by utilizing links, such as shown in FIG. 10, to form a chain, as shown in FIG. 11. In this structure, the imaginary pivotal point is the center of a circle defined by the arcuate slots 28 and 29 .

FIGS. 12–14 illustrate another embodiment of the invention. In this embodiment, an inner plate shown in FIG. 12, and an outer plate shown in FIG. 13, each having two convex ends, are utilized. The inner plate 36 comprises convex ends 37 and 38, arcuate slots 39, 40, 41, and 42, pivot pin holes 43 and 44, and supporting member mounting holes 45 and 46. The outer plate 47 shown in FIG. 13 comprises convex ends 48 and 49, limit pin holes 50, 51, 52, and 53, and pivot pin holes 54 and 55. Although not shown, supporting member mounting holes may be utilized similarly to those shown at 45 and 46 in FIG. 12 if it is desired to place supporting members on the outer plates. In the operation of this embodiment also, the pivot pins 58 and 59 cooperate with the arcuate slots 41 and 42 to provide support on both sides of the pivot pin 61 in both limiting positions, as explained above with regard to FIG. 11.

FIG. 14 illustrates a portion of a chain prepared from two links as shown in FIG. 13 and one interconnecting link as shown in FIG. 12. The chain is assembled by means of limit pins 56, 57, 58 and 59, pivot pins 60 and 61, and securing washers 62. Supporting members 5 and 6 are affixed by means of bolts 30 and nuts 31. If desired, mounting holes may also be provided in the plates of FIG. 13 if it is desired to affix additional supporting members to these plates.

For some applications, the pivot pins 60 and 61 and their complementary holes 43, 44, 54, and 55 may be omitted. In this case the arcuate slots 39, 40, 41 and 42 provide the pivotal motion in conjunction with the pins 56, 57, 58 and 59 about an imaginary pivot point which is the center of the circle defined by the arcuate slots.

In the embodiment shown in FIG. 14 the arcuate slots 39, 40, 41, and 42 are exposed on one side of the chain. In another embodiment, shown in FIG. 14a, two superposed outer links 47 may be utilized having the ends of the inner links 36 interposed therebetween. In this structure the arcuate slots 39, 40, 41 and 42 are covered on both sides.

A chain may be constructed which is additionally shielded at its edges by utilizing a plurality of inserts 63 having mounting holes 64 and 65, as shown in FIG. 15. Complementary links may be constructed by affixing two inserts 63 to the inner plate shown in FIG. 12 to form the structure shown in FIG. 16, and one insert 63a intermediate two outer plates shown in FIG. 13 (with mounting holes 45 and 46 added) to form the structure shown in FIG. 17. FIG. 18 illustrates in top view two outer links of FIG. 17 interconnected by an inner link of FIG. 16. In the structure of the links shown in FIG. 16 and FIG. 17, at each end of each link, the convex ends of the plates and the concave ends of the inserts are substantially contiguous with the surface of a common cylinder whose axis passes through the pivotal point at that end and is perpendicular to the surfaces of the plate. As a result, the ends of each link as well as the edges of the links are completely shielded.

The supporting chain structure of the present invention has a number of advantages over prior art structures. First, in addition to providing all the necessary functions of conduit support for the particular application, that is, providing two limits of pivotal movement between the two links so that the chain is self-supporting when extended horizontally at one limit, and self-supporting about a defined radius of curvature at the other limit, the present structure provides two points of support at opposite sides of the pivot point for each limiting position, thereby greatly reducing the shear force against the pivot pin where such a pin is used and preventing rapid wear of the pivot pin and associated bearing structures. Moreover, the limiting pin structure may be so designed that all shear force is removed from the pivot structure at the limiting positions. So precise may the present structure be constructed that in some cases the pivot pin may be completely obviated. The present structure has the further advantage that, because the links have mating convex and concave ends in the one embodiment and mating convex and concave surfaces between the plate ends and the insert surfaces in the other embodiment, the moving edges of the chain are completely shielded, and the possibility of injuries to the person of the operator removed. Moreover, because the chain in most of its embodiments is completely enclosed, it is virtually impossible for foreign particles such as metal turnings to become ensnared in the chain and thereby enter inside the chain and cause failure of operation. As a further advantage, the chain is made of simply cut and drilled flat plates which may be readily assembled and readily dismantled for repair or link replacement.

Although the structure of the present invention has been shown and described in relation to the use of metal plates, plastic plates may be substituted for many applications. Moreover, instead of using flat plates, unitary plastic or molded metal links may be utilized instead of links prepared by bolting together two or more plates.

As further variations, instead of using limiting pins or pivot pins which are secured in the form of bolts, or rivets which are secured by nuts or washers, pins may be utilized which are merely swaged or forced into suitably prepared holes in one plate and which remain self-supporting.

Although in the embodiments described and shown in the drawings each link is comprised of only two or three plates, it is of course to be understood that 4, 5, 6, or even more plates may be utilized for certain purposes and are to be considered as falling within the invention disclosed and claimed. For example, additional plates may be utilized to give greater strength to each link. Additional plates having limit means may be utilized to provide greater strength at the limiting positions. Alternatively, very thin plates may be utilized at the outside of the link to serve as a cover or shield for the slots, notches, etc., which comprise the limit means. Additionally, instead of complete plates, partial plates may be utilized to cover the slots, notches, etc., which remain exposed, as for example, when only two plates are utilized in a link.

It is to be understood that the invention is not limited to the exact details of construction, operation, or exact materials or embodiments shown and described, as obvious modifications and equivalents will be apparent to one skilled in the art.

I claim:

1. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced apart relationship, each of said chains comprising a plurality of interconnected links, each pair of interconnected links having their ends connected and arranged for pivotal movement with respect to each other about a common pivotal point, each of said links comprising at least two plates, each plate comprising a convexly arcuate end and a concavely arcuate end adapted to mate with the concavely arcuate end and convexly arcuate end, respectively, of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantial contiguous with the surface of a common imaginary cylinder having its axis through the pivotal point of the link, said links being provided with at least two limit pins each spaced apart from said pivotal point and a pair of complementary arcuate slots engaging said limit pins, said limit pins and said slots cooperating to provide two limiting positions for said pivotal movement and to provide two points of support at each limiting position, thereby reducing the shear force applied at said pivotal point.

2. A support according to claim 1, wherein said conduit supporting means comprises a plurality of transverse supporting members each affixed at one end to a link of one of said chains and at the other end to a link of the other of said chains, and wherein each supporting member is provided with an aperture adapted to have said conduit disposed therethrough.

3. A support according to claim 1, wherein each of said conduit supporting means comprises a pair of transverse supporting members each connected at one end to a link of one of said chains and at the other end to a link of the other of said chains, one of said supporting members being positioned at one edge of said chain and the other being positioned at the other edge of said chain, said conduit being adapted to be disposed intermediate said supporting members.

4. A support according to claim 1 having pivot pin holes at the common pivotal point at each end of said links and a pivot pin journaled in said pivot pinholes.

5. A support according to claim 1 wherein each link is provided with said limit pins at one end and with said arcuate slots at the other, the slots of one link engaging the limit pins of an adjacent link.

6. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced apart relationship, each of said chains comprising a plurality of interconnected links, each pair of interconnected links having their ends connected and arranged for pivotal movement with respect to each other about a common pivotal point, wherein each link is comprised of three plates, each plate comprising a convexly arcuate end and a concavely arcuate end adapted to mate with the concavely arcuate and convexly arcuate end, respectively, of adjacent links, two of said plates (14) being oriented in spaced apart superposition and a third plate (22) being oppositely oriented to said two plates, the concavely arcuate ends (16) of said superposed plates overlapping and including therebetween the concavely arcuate end (24) of said intermediate plate, and means affixing said plates together, the convexly arcuate ends of said outer plates being provided with said limit pins (32, 33) and the convexly arcuate end of said intermediate plate being provided with said arcuate slots (28, 29), the convexly arcuate ends of said outer plates and the concavely arcuate end of said intermediate plate being substantially contiguous with the surface of a common imaginary cylinder whose axis passes through the pivotal point at the end of said link, and the concave ends of said outer plates and the convex end of said inner plate being substantially contiguous with the surface of a common imaginary cylinder whose axis passes through the pivotal point at the other end of said link the convex end of each intermediate plate being positioned intermediate the convex ends of the outer plates of an adjacent link and having the limit pins of an adjacent link engaged in the arcuate slots of said intermediate plate, said links being provided with at least two limit pins each spaced apart from said pivotal point and a pair of complementary arcuate slots engaging said limit pins, said limit pins and said slots cooperating to provide two limiting positions for said pivotal movement and to provde two points of support at each limiting position, thereby reducing the shear force appplied at said pivotal point.

7. A support according to claim 6, wherein said limit pins and said arcuate slots are so disposed that said chains are self-supporting at one pivotal limiting position in a straight line and at the other pivotal limiting position in an arc having a predetermined radius of curvature.

8. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced apart relationship, each of said chains comprising a plurality of interconnected links, each pair of interconnected links having their ends connected and arranged for pivotal movement with respect to each other about a common pivotal point, wherein each of said links comprises two convex ends, and wherein one end is provided with said limit pins and the other end is provided with said arcuate slots engaging the limit pins of an adjacent link, said links being provided with at least two limit pins each spaced apart from said pivotal point and a pair of complementary arcuate slots engaging said limit pins, said limit pins and said slots cooperating to provide two limiting positions for said pivotal movement and to provide two points of support at each limiting position, thereby reducing the shear force applied at said pivotal point, each link is comprised of a pair of spaced apart superposed plates (47) and an intermediate plate (36) pivotally connected to said pair of plates at one end and pivotally connected to the superposed plates (47) of an adjacent link.

9. A support according to claim 8, wherein said intermediate plate is provided with a pair of inserts (63) one affixed at each side of said intermediate plate at the midportion thereof, and said superposed plates are provided with a single insert (63a) affixed intermediate said plate at the midportion thereof, each of said inserts having two concave ends mating with the convex end of an adjacent plate, thereby enclosing said convex ends and preventing foreign objects from becoming entrapped between said links.

10. A chain comprising a plurality of interconnected links, each pair of interconnected links having their ends connected and arranged for pivotal movement with respect to each other about a common pivotal point, each of said links comprising at least two plates, each plate comprising a convexly arcuate end and a concavely arcuate end adapted to mate with the concavely arcuate end and convexly arcuate end, respectively, of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantially contiguous with the surface of a common imaginary cylinder having its axis through the pivotal point of the link, said links being provided with at least two limit pin means, each spaced apart from said pivotal point, and a pair of complementary arcuate slots engaging said limit pin means, said limit pin means and said slots cooperating to provide two limiting positions for said pivotal movement and to provide two supporting points at each limiting position, thereby reducing the shear force applied at said pivotal point.

11. A chain according to claim 10 having pivot pin holes at the common pivotal point at each end of said links and a pivot pin journaled in said pivot pin holes.

12. A chain according to claim 10, wherein each link is provided with said limit pins at one end and with said arcuate slots at the other engaging the limit pins of an adjacent link.

13. A chain comprising a plurality of interconnected links, each pair of interconnected links having their ends connected and arranged for pivotal movement with respect to each other about a common pivotal point, wherein each link is comprised of three plates, each plate comprising a convexly arcuate end and a concavely arcuate end adapted to mate with the concavely arcuate and convexly arcuate end, respectively, of adjacent links, two of said plates (14) being oriented in spaced apart superposition and a third plate (22) being oppositely oriented to said two plates, the concavely arcuate ends (16) of said superposed plates overlapping and including therebetween the concavely arcuate end 24 of said intermediate plate, and means affixing said plates together, the convexly arcuate ends of said outer plates being provided with said limit pins (32, 33) and the convexly arcuate end of said intermediate plate being provided with said arcuate slots (28, 29), the convexly arcuate ends of said outer plates and the concavely arcuate end of said intermediate plate being substantially contiguous with the surface of a common imaginary cylinder whose axis passes through the pivotal point at the end of said link, and the concave ends of said outer plates and the convex end of said inner plate being substantially contiguous with the surface of a common imaginary cylinder whose axis passes through the pivotal point at the other end of said link the convex end of each intermediate plate being positioned intermediate the convex ends of the outer plates of an adjacent link and having the limit pins of an adjacent link engaged in the arcuate slots of said intermediate plate, said links being provided with at least two limit pin means, each spaced apart from said pivotal point, and a pair of complementary arcuate slots engaging said limit pin means, said limit pin means and said slots cooperating to provide two limiting positions for said pivotal movement and to provide two supporting points at each limiting position thereby reducing the shear force applied at said pivotal point.

14. A chain according to claim 13, wherein said limit pins and said arcuate slots are so disposed that said chain is self-supporting at one pivotal limiting position in a straight line and at the other pivotal limiting position in an arc having a predetermined radius of curvature.

15. A support according to claim 14, wherein each pair of adjacent links is provided at each pivotal end with a pivot hole and a pivot pin journaled through pivot holes.

16. A chain according to claim 15, wherein each link is comprised of a pair of spaced apart superposed plates (47) and an intermediate plate (36) pivotally connected to said pair of plates at one end and pivotally connected to the superposed plates (47) of an adjacent link.

17. A chain according to claim 16, wherein said intermediate plate is provided with a pair of inserts (63) one affixed at each side of said itermediate plate at the midportion thereof, and said superposed plates are provided with a single insert (63a) affixed intermediate said plate at the midportion thereof, each of said inserts having two concave ends mating with the convex end of an adjacent plate, thereby enclosing said convex ends and preventing foreign objects from becoming entrapped between said links.

References Cited

UNITED STATES PATENTS

| | | | |
|---|---|---|---|
| 1,066,874 | 7/1913 | Aldridge | 214—26 |
| 1,126,904 | 2/1915 | Stark | 305—47 |
| 1,358,494 | 11/1920 | Arndt | 305—47 |
| 3,284,036 | 11/1966 | Nansel | 248—49 |
| 3,330,105 | 7/1967 | Weber | 191—12 X |

FOREIGN PATENTS 1,460,204  10/1966  France.

CHANCELLOR E. HARRIS, Primary Examiner

U.S. Cl. X.R.

59—78.1